United States Patent
Mochizuki

(10) Patent No.: US 9,988,169 B2
(45) Date of Patent: Jun. 5, 2018

(54) DEEP-DRAWING PACKAGING MACHINE

(71) Applicant: MECHANIZE INC., Mobara-shi, Chiba (JP)

(72) Inventor: Masaru Mochizuki, Chiba (JP)

(73) Assignee: MECHANIZE INC., Mobara-Shi, Chiba (JP)

(*) Notice: Subject to any disclaimer, the term of this patent is extended or adjusted under 35 U.S.C. 154(b) by 639 days.

(21) Appl. No.: 14/413,396

(22) PCT Filed: Jul. 24, 2013

(86) PCT No.: PCT/JP2013/070107
§ 371 (c)(1),
(2) Date: Jan. 7, 2015

(87) PCT Pub. No.: WO2014/017560
PCT Pub. Date: Jan. 30, 2014

(65) Prior Publication Data
US 2015/0191267 A1    Jul. 9, 2015

(30) Foreign Application Priority Data

Jul. 26, 2012  (JP) .................................. 2012-166393
Sep. 20, 2012  (JP) .................................. 2012-207474

(51) Int. Cl.
*B65B 51/10* (2006.01)
*B65B 41/02* (2006.01)
(Continued)

(52) U.S. Cl.
CPC ............ *B65B 51/10* (2013.01); *B29C 51/261* (2013.01); *B29C 65/18* (2013.01);
(Continued)

(58) Field of Classification Search
None
See application file for complete search history.

(56) References Cited

U.S. PATENT DOCUMENTS 3,289,512 A * 12/1966 Sloan ...................... B65B 61/06
                                              100/229 R
3,837,782 A *  9/1974 Meissner ................ B29C 51/00
                                              425/347

(Continued)

FOREIGN PATENT DOCUMENTS

CN       101357694 A    2/2009
EP       0483569 A1     5/1992
(Continued)

OTHER PUBLICATIONS

International Search Report (ISR) dated Oct. 15, 2013 issued in International Application No. PCT/JP2013/070107.

*Primary Examiner* — Hemant M Desai
*Assistant Examiner* — Tanzim Imam
(74) *Attorney, Agent, or Firm* — Holtz, Holtz & Volek PC

(57) ABSTRACT

A deep-drawing packaging machine includes a sealing device that clamps and seals a top film and a bottom film by an upper mold and a lower mold, clamping tabs that clamp both-side edges of at least one of the top film and the bottom film, and a carrying device that carries at least one of the top film and the bottom film clamped by the clamping tabs. The clamping tabs are configured such that a gap is generated between the clamping tabs and the top film and the bottom film, positioned in a range clamped by the upper mold and the lower mold, when the upper mold and the lower mold of the sealing device are closed.

1 Claim, 14 Drawing Sheets

(51) Int. Cl.
*B65B 61/06* (2006.01)
*B65B 9/04* (2006.01)
*B65B 41/12* (2006.01)
*B65B 47/10* (2006.01)
*B65B 51/14* (2006.01)
*B65H 29/00* (2006.01)
*B29C 51/26* (2006.01)
*B29C 65/18* (2006.01)
*B29C 65/78* (2006.01)
*B29C 51/18* (2006.01)
*B29C 65/00* (2006.01)
*B29L 31/00* (2006.01)

(52) U.S. Cl.
CPC ........ *B29C 65/7891* (2013.01); *B29C 66/112* (2013.01); *B29C 66/131* (2013.01); *B29C 66/8322* (2013.01); *B65B 9/04* (2013.01); *B65B 41/02* (2013.01); *B65B 41/12* (2013.01); *B65B 47/10* (2013.01); *B65B 51/14* (2013.01); *B65B 61/06* (2013.01); *B65H 29/005* (2013.01); *B29C 51/18* (2013.01); *B29C 66/53461* (2013.01); *B29C 2793/0018* (2013.01); *B29C 2793/0081* (2013.01); *B29L 2031/7164* (2013.01)

(56) References Cited

U.S. PATENT DOCUMENTS

| | | | |
|---|---|---|---|
| 3,867,088 A * | 2/1975 | Brown | B29C 51/12 425/156 |
| 3,897,675 A | 8/1975 | Wilson | |
| 4,034,536 A * | 7/1977 | Mahaffy | B29C 51/22 53/427 |
| 4,475,881 A * | 10/1984 | Borst | B29C 51/18 425/324.1 |
| 4,601,421 A | 7/1986 | Natterer et al. | |
| 5,048,268 A | 9/1991 | Brembilla et al. | |
| 5,269,123 A | 12/1993 | Marchesini | |
| 2009/0039539 A1* | 2/2009 | Emori | B29C 51/262 264/101 |

FOREIGN PATENT DOCUMENTS

| | | |
|---|---|---|
| JP | 55050932 U | 4/1980 |
| JP | 04018225 A | 1/1992 |
| JP | 10129632 A | 5/1998 |
| JP | 2005225540 A | 8/2005 |
| JP | 2007276813 A | 10/2007 |

* cited by examiner

DEEP-DRAWING PACKAGING MACHINE

TECHNICAL FIELD

The present invention relates to a deep-drawing packaging machine used for packaging, for example, food and particularly relates to a deep-drawing packaging machine capable of manufacturing packaging containers without generating scraps from films and thereby capable of achieving reduction in film cost, industrial waste management cost, and the amount of carbon dioxide discharged.

BACKGROUND ART

Conventionally, as a deep-drawing packaging machine used for packaging, for example, food, a deep-drawing packaging machine 1 as shown in FIG. 6 has been known. The deep-drawing packaging machine 1 is basically configured to manufacture containers 5, in which, for example, food ingredients are packaged, by placing, for example, the food ingredients (not shown) in a bottom film 2 molded in recessed shapes, then covering them with a top film 3, and sealing (hermetically closing) them by a sealing device 4.

In FIG. 6, a molding device for molding the bottom film 2 into the recessed shapes by molds is represented by 6, an unprocessed roll of the bottom film 2 is represented by 7, an unprocessed roll of the top film 3 is represented by 8, a cross-cutter device which cuts the sealed bottom film 2 and top film 3 in the direction perpendicular to the direction in which they are carried is represented by 9, a length cutter device which cuts the sealed bottom film 2 and top film 3 in parallel to the direction in which they are carried is represented by 10, and an infeed roller for guiding the bottom film 2 to the molding device 6 is represented by 11.

FIG. 7 shows, in an enlarged manner, the vicinity of an infeed roller 11 of the deep-drawing packaging machine 1. As shown in the drawing, the deep-drawing packaging machine 1 has, as a carrying device which carries the bottom film 2, clamping tabs 12 which clamp both-side edges of the bottom film 2, endless chains 13 to which the clamping tabs 12 are fixed, and sprockets 14 around which the endless chains 13 are suspended. The sprockets 14 are configured to be rotated by drive of a motor, which is not shown here, thereby carrying the bottom film 2 to the direction of an arrow in the drawing.

FIG. 8 shows details of the clamping tabs 12 and the endless chain 13. As shown in the drawing, the clamping tab 12 consists of an upper tab 15, a lower tab 16, and a spring 17 and is configured so that, when the upper tab 15 and the lower tab 16 are brought into close contact with each other by the biasing action of the spring 17, the clamping tab 12 is closed and clamps the bottom film 2. Moreover, as shown in FIG. 7, the clamping tab 12 is configured to open the upper tab 15 and the lower tab 16 at the position of the sprocket 14 by an action of a cam plate (not shown) provided to be coaxial with the sprocket 14. As shown in FIG. 7 and FIG. 9, in this process, the clamping tab 12 is configured so that only the upper tab 15 is opened while it is moved toward outside.

The bottom film 2 is configured so that the both-side edges thereof are clamped by the clamping tabs 12 having the configuration as described above, after the bottom film 2 is molded into recessed shapes by the molding device 6, for example food ingredients (not shown) are placed therein, then, they are covered with the top film 3 as shown in FIG. 6, and they are sealed by the sealing device 4. In this process, as shown in FIG. 10, after the bottom film 2 is clamped at the position of the sprockets 14, the clamping tabs 12 are configured to carry the bottom film 2 while continuing clamping to the position of the length cutter device 10. Moreover, before the top film 3 is carried to the sealing device 4, as well as the bottom film 2, the top film 3 is configured so that the both edges thereof are clamped by the clamping tabs 12, and the top film 3 is then carried to the sealing device 4 together with the bottom film 2, which has undergone recessed-shape molding.

The sealing device 4 is configured to seal the bottom film 2 and the top film 3 in the steps shown in FIG. 11. As shown in the drawing, the sealing device 4 basically consists of an upper mold 4a, a lower mold 4b, and a sealing hot plate 18.

First, as shown in (A) of the drawing, the bottom film 2 and the top film 3 clamped by the clamping tabs 12 are carried to the part between the upper mold 4a and the lower mold 4b, which are opened to the upper and lower sides. Then, as shown in (B) of the drawing, the lower mold 4b is moved up, the upper mold 4a and the lower mold 4b are closed, and, at the same time with that, air is removed from ventilation holes 19a and 19b provided on the upper and lower molds 4a and 4b, respectively, to bring the interiors of the containers 5 into a vacuum state.

Then, as shown in (C) of the drawing, the sealing hot plate 18 is moved down, the bottom film 2 and the top film 3 are sealed by thermal welding, and sealing of the containers 5 is carried out. Then, as the sealing hot plate 18 is moved up, the lower mold 4b is moved down, and the upper mold 4a and the lower mold 4b are opened and are returned to the state of (A) of the drawing. These steps of (A) to (C) of FIG. 11 are repeated to carry out the sealing step by the sealing device 4.

In the step of (B) of the drawing, as shown by a plurality of small arrows, the air in the containers 5 is configured to be removed from the vicinities of the both sides of the bottom film 2 to the outside the containers 5 through ventilation pipes 20 provided in the lower mold 4b. Herein, as shown in FIG. 12, the bottom film 2 is provided with a plurality of punch holes 21 along the both-side edges of the bottom film 2, and the positions of the punch holes 21 and the positions of open ends 20a of the ventilation pipes 20 are configured to match each other. Therefore, the air in the containers 5 is configured to flow to the ventilation pipes 20 through the punch holes 21.

The punch holes 21 are configured to be formed in the bottom film 2 by, for example, punching gears (not shown) provided to be coaxial with the sprockets 14 before the bottom film 2 is carried to the sealing device 4. Normally, the punching hole shapes thereof are designed so that punching scraps of punching are not dropped when the punch holes 21 are formed. Furthermore, the air in the containers 5 is not removed from the ventilation holes 19a of the upper mold 4a because of the presence of the top film 3; however, in order to maintain the pressure balance around the containers 5, degassing is configured to be carried out also from the ventilation holes 19a.

Incidentally, when the containers 5 are to be manufactured by using the deep-drawing packaging machine 1 having such a configuration, it has been essential to provide the punch holes 21. This is for a reason that, if the punch holes 21 are not provided, air cannot be removed from the containers 5. Therefore, in order to ensure the space for providing the punch holes 21, conventionally, extra parts having a predetermined width have been provided at the both-side edges of the bottom film 2 as shown by S of FIG. 12. The extra parts S are unnecessary in the containers 5 and are therefore have to be removed before the containers 5 are completed. Normally, the extra parts S have been cut off as scraps by the length cutter device 10 in manufacturing.

However, since the scraps cut off in this manner have to be processed as wastes, there has been a problem that the processing takes labor and time.

Under such circumstances, the inventor of the present application has diligently studied the methods and means that can solve the above described problem. As a result, the inventor of the present application has found out that the above described problem can be solved when the deep-drawing packaging machine is configured so that the clamping tabs are moved while the clamping tabs are separated from the bottom film 2 and the top film 3 at predetermined positions and accomplished the present invention.

When the inventor and applicant of the present application researched past patent literatures, etc. before application of the present invention, below literatures have been found about deep-drawing packaging machines; however, patent literatures describing technical ideas, etc. related to the present invention in detail were not found.

CITATION LIST

Patent Literatures

[Patent Literature 1] Japanese Patent Application Laid-Open No. H10-129632
[Patent Literature 2] Japanese Patent Application Laid-Open No. 2005-225540

SUMMARY OF INVENTION

Technical Problem

The present invention relates to a deep-drawing packaging machine used for packaging, for example, food, and, particularly, it is an object to provide a deep-drawing packaging machine capable of manufacturing packaging containers without generating scraps from films and thereby capable of achieving reduction in film cost, industrial waste management cost, and the amount of carbon dioxide discharged.

Solution to Problem

As a means therefor, a deep-drawing packaging machine according to the present invention is a deep-drawing packaging machine having: a sealing device that clamps and seals a top film and a bottom film by an upper mold and a lower mold, clamping tabs that clamp both-side edges of the top film and/or the bottom film, and a carrying device that carries the top film and/or the bottom film clamped by the clamping tabs; wherein the clamping tabs are configured to be brought into a state that the clamping tabs are not in contact with the top film and the bottom film positioned in a range clamped by the upper mold and the lower mold when the upper mold and the lower mold of the sealing device are closed.

Moreover, a deep-drawing packaging machine according to the present invention is a deep-drawing packaging machine having: a sealing device that clamps and seals a top film and a bottom film by an upper mold and a lower mold, clamping tabs that clamp both-side edges of the top film and/or the bottom film, and a carrying device that carries the top film and/or the bottom film clamped by the clamping tabs; wherein a gap is configured to be generated between the clamping tab and the top film and the bottom film positioned in a range clamped by the upper mold and the lower mold when the upper mold and the lower mold of the sealing device are closed.

Furthermore, a deep-drawing packaging machine according to the present invention is a deep-drawing packaging machine having: a sealing device that clamps and seals a top film and a bottom film by an upper mold and a lower mold, clamping tabs that clamp both-side edges of the top film and/or the bottom film, a carrying device that carries the top film and/or the bottom film clamped by the clamping tabs, and a cutter that cuts the sealed top film and bottom film at a predetermined position; wherein the clamping tabs are configured to be brought into a state that the clamping tabs are not in contact with the top film and the bottom film positioned in a range clamped by the upper mold and the lower mold when the upper mold and the lower mold of the sealing device are closed; and the clamping tabs are configured to be brought into a state that the clamping tabs are not in contact also with the top film and the bottom film positioned in a range in contact with the cutter.

Moreover, a deep-drawing packaging machine according to the present invention is a deep-drawing packaging machine having: a sealing device that clamps and seals a top film and a bottom film by an upper mold and a lower mold, clamping tabs that clamp both-side edges of the top film and/or the bottom film, a carrying device that carries the top film and/or the bottom film clamped by the clamping tabs, and a cutter that cuts the sealed top film and bottom film at a predetermined position; wherein a gap is configured to be generated between the clamping tab and the top film and the bottom film positioned in a range clamped by the upper mold and the lower mold when the upper mold and the lower mold of the sealing device are closed; and a gap is configured to be generated also between the clamping tab and the top film and the bottom film positioned in a range in contact with the cutter.

Advantageous Effects of Invention

According to the present invention, a deep-drawing packaging machine that is related to a deep-drawing packaging machine used for packaging, for example, food and is particularly capable of manufacturing packaging containers without generating scraps from films and thereby capable of achieving reduction in film cost, industrial waste management cost, and the amount of carbon dioxide discharged is provided.

DESCRIPTION OF EMBODIMENTS

Figure 6:
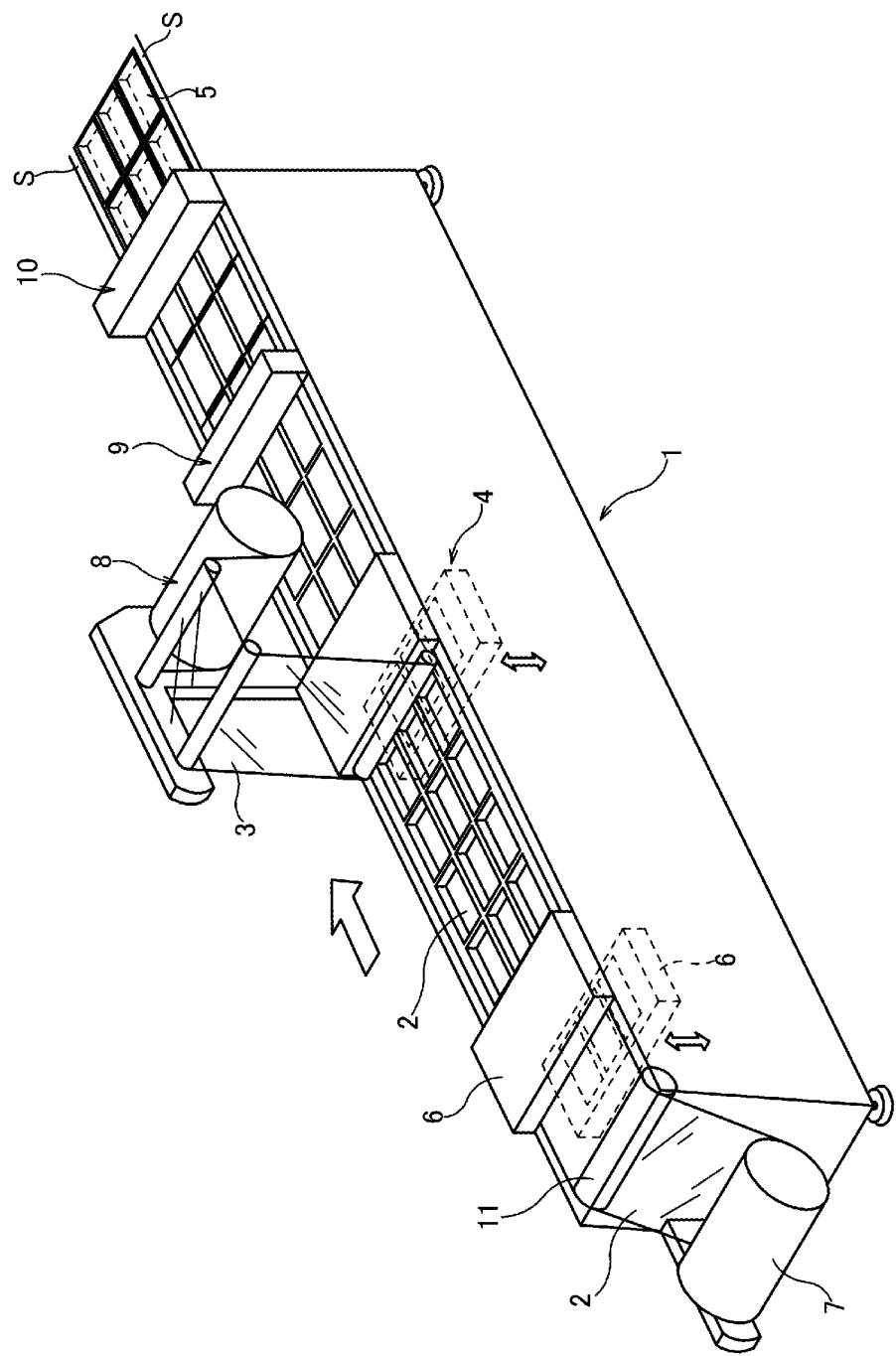
FIG. 6 is a drawing showing the deep-drawing packaging machine 1.
Figure 7:
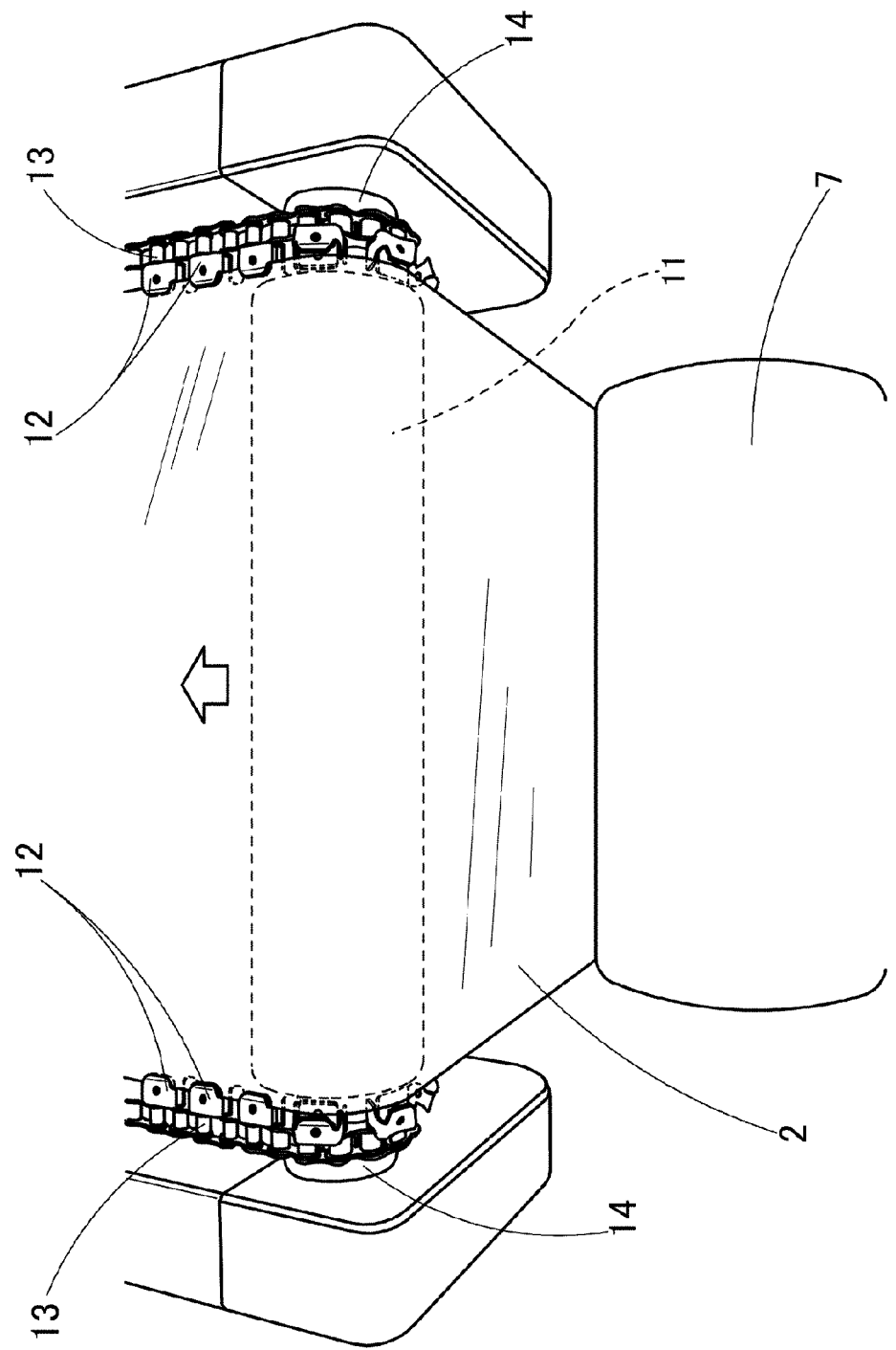
FIG. 7 is a drawing showing a carrying device of the deep-drawing packaging machine 1.
Figure 8:
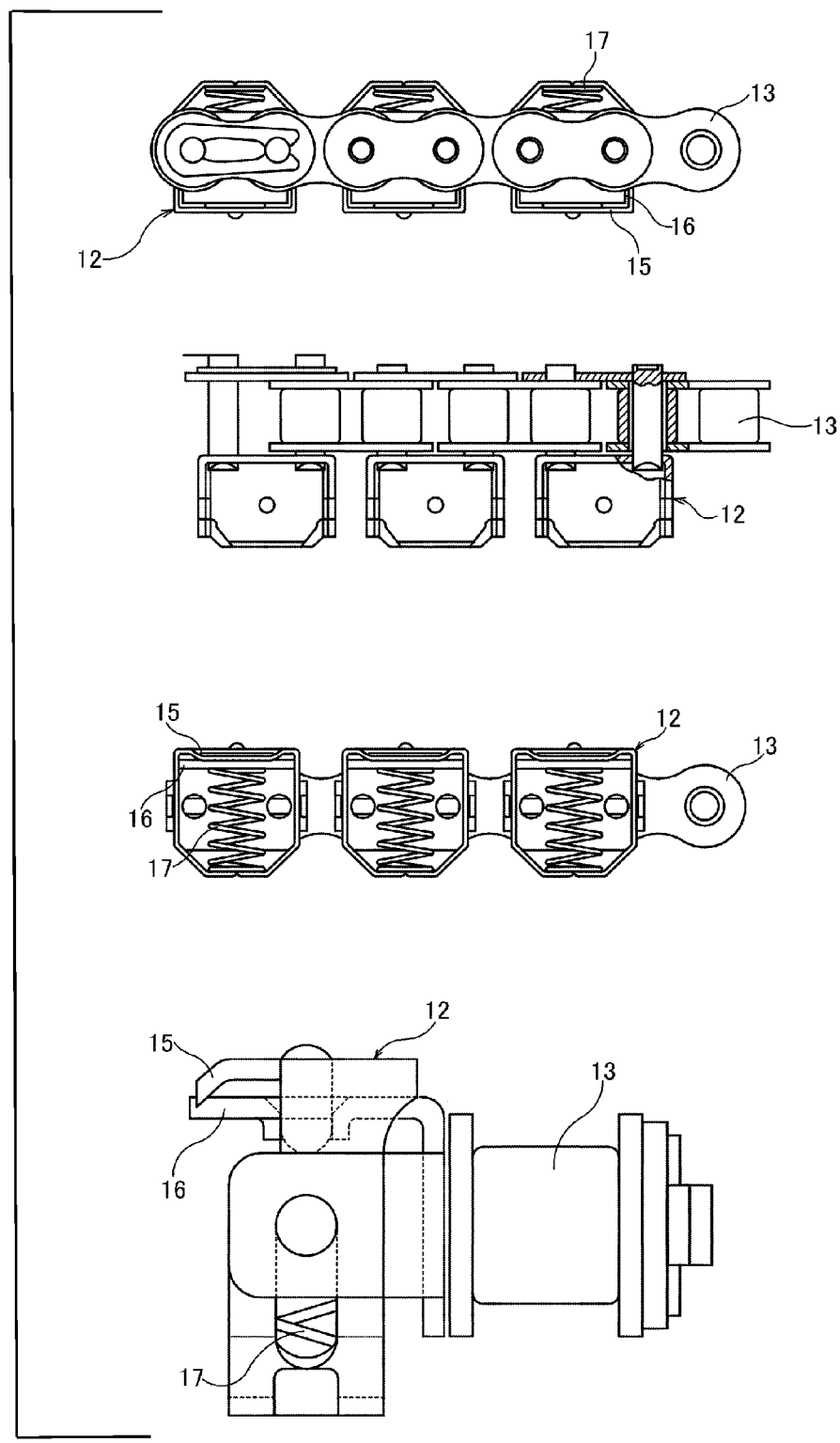
FIG. 8 is a drawing showing clamping tabs 12 and an endless chain 13.
Figure 9:
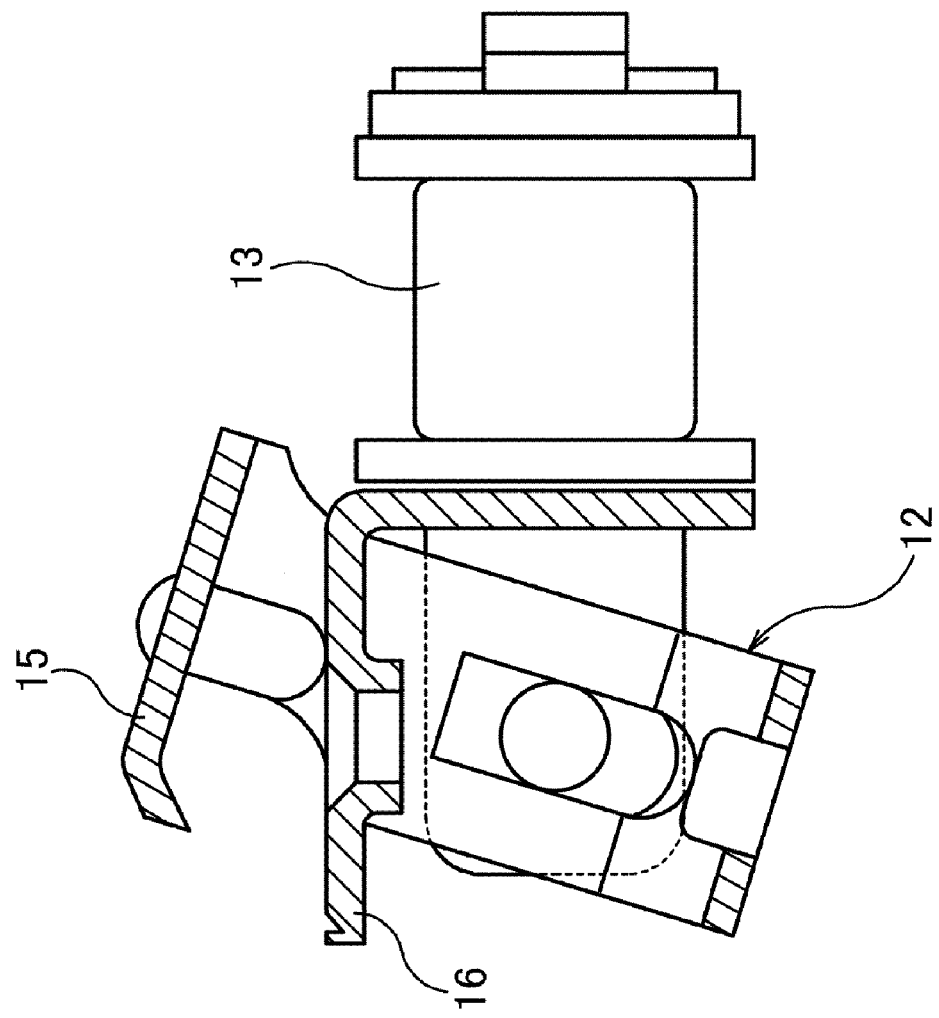
FIG. 9 is a drawing showing the clamping tab 12 and the endless chain 13.
Figure 10:
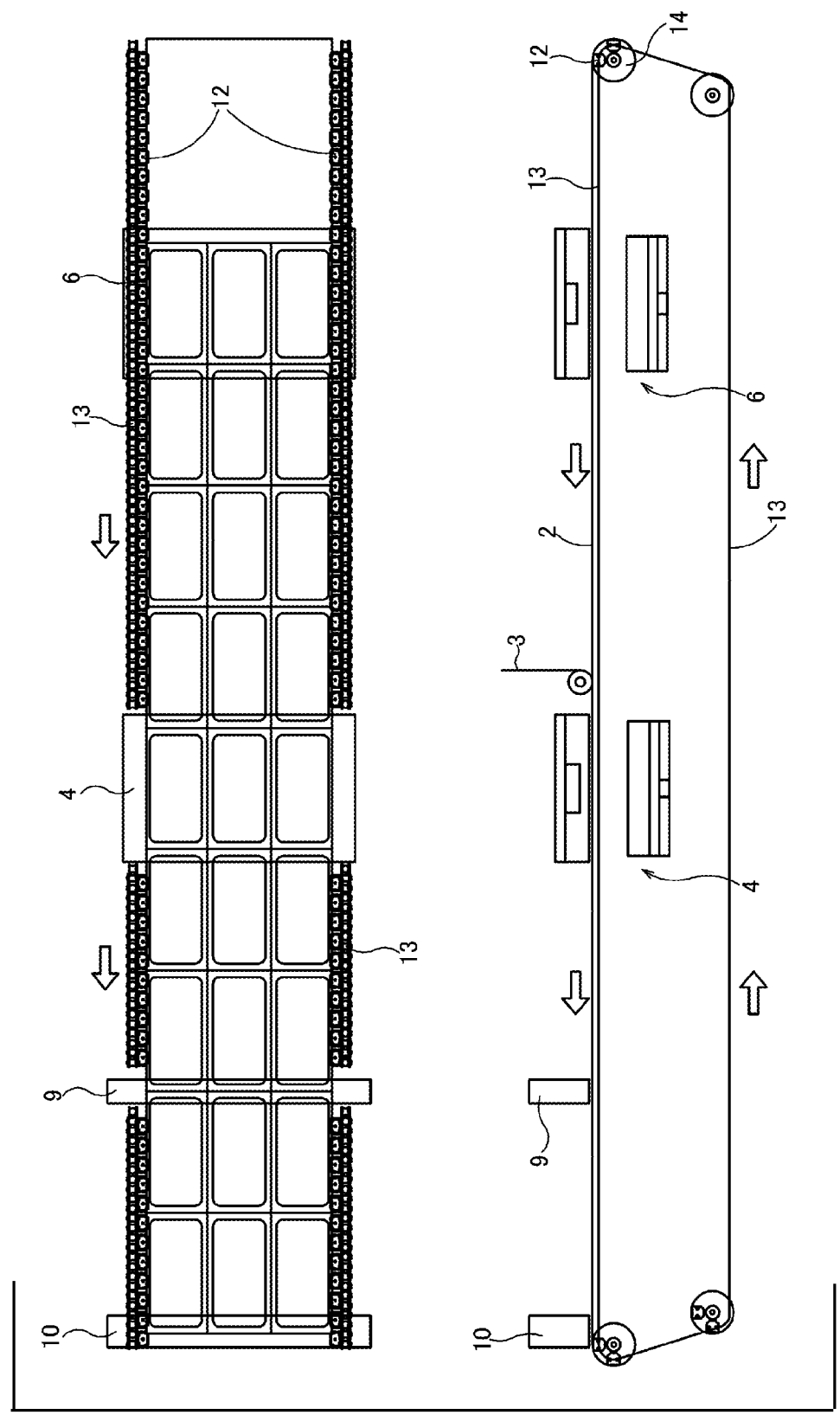
FIG. 10 is a drawing showing a conventional deep-drawing packaging machine 1.
Figure 11:
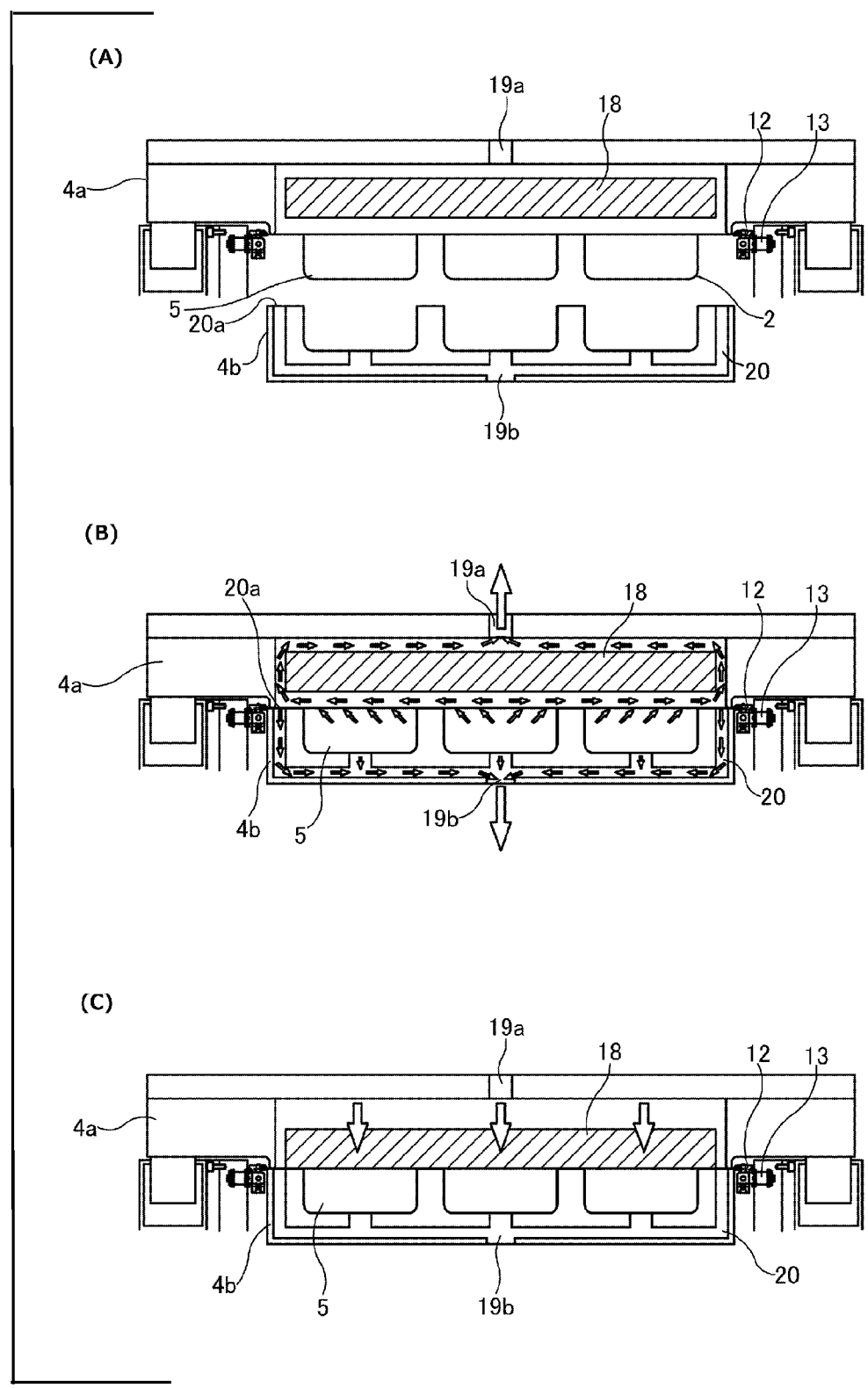
FIG. 11 is a drawing showing a sealing device 4 of the conventional deep-drawing packaging machine 1.
Figure 12:
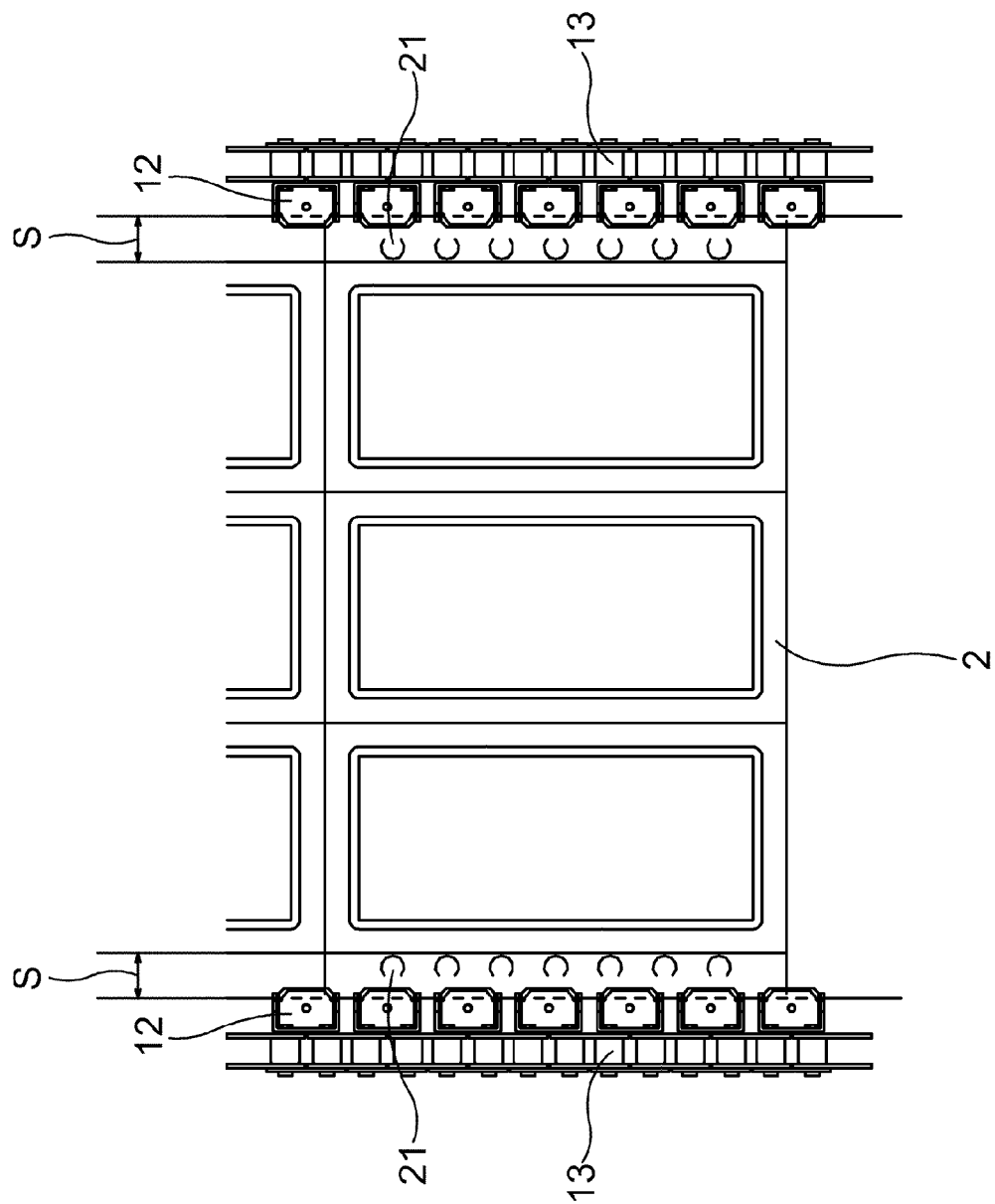
FIG. 12 is a drawing showing a bottom film 2 of the conventional deep-drawing packaging machine 1.

Hereinafter, modes for carrying out a deep-drawing packaging machine according to the present invention will be described. Since the basic configuration of the deep-drawing packaging machine according to the present embodiment is also the same as that of the conventional one shown in FIG. 6, FIG. 6 and the reference signs used in FIG. 6 are used without change also in the description herein.

Figure 1:
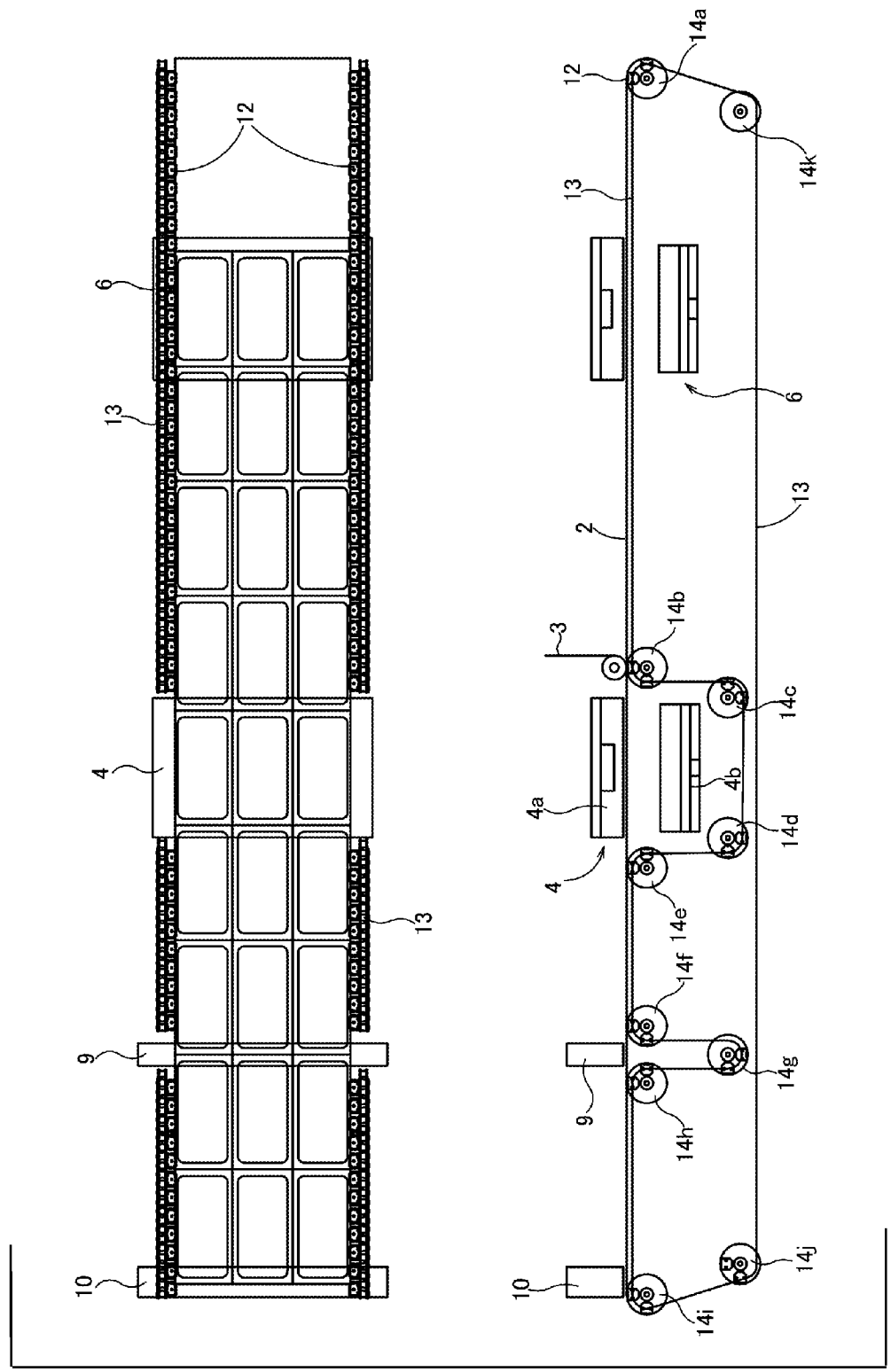
FIG. 1 is a drawing showing a deep-drawing packaging machine 1 according to an embodiment of the present invention.

A point that a deep-drawing packaging machine 1 according to the present embodiment is different from the conventional one is the point that, as shown in FIG. 1, at the positions where a sealing device 4 and a cross-cutter device 9 are actuated, clamping tabs 12 are configured to be moved while the clamping tabs are separated from bottom film 2 and top film 3 without clamping them. In FIG. 1, the sprockets present at the positions where the bottom film 2 is clamped for the first time are referred to as first sprockets 14a, and the sprockets brought into contact with endless chains 13 thereafter are sequentially referred to as second to eleventh sprockets (14b to 14k) in the description of the present application.

First, at the position where the sealing device 4 is actuated, as shown in the drawing, the endless chains 13 are configured to be guided by the second sprocket 14b and the third sprocket 14c, pass below a lower mold 4b, then be guided by the fourth sprocket 14d and the fifth sprocket 14e, and be returned again to the height where the bottom film 2 and the top film 3 can be clamped.

The second sprocket 14b is provided with a cam plate (not shown), which is coaxial therewith, and the actuation thereof opens upper tabs 15 and lower tabs 16 at the position of the second sprocket 14b so that the clamping tabs 12 are separated from the bottom film 2 and the top film 3.

The fifth sprocket 14e is also provided with a cam plate (not shown), which is coaxial therewith, and the actuation thereof closes the upper tabs 15 and the lower tabs 16 at the position of the fifth sprocket 14e so that the bottom film 2 and the top film 3 can be clamped by the clamping tabs 12.

In other words, the deep-drawing packaging machine 1 according to the present embodiment has a characteristic that, when the upper mold 4a and the lower mold 4b of the sealing device 4 are closed, the clamping tabs 12 are configured to be brought into a state that they are not in contact with the top film 3 and the bottom film 2 positioned in the range clamped by the upper mold 4a and the lower mold 4b.

In other words, this characteristic can be also expressed as: when the deep-drawing packaging machine 1 according to the present embodiment closes the upper mold 4a and the lower mold 4b of the sealing device 4, a gap is configured to be generated between each clamping tab 12 and the top film 3 and the bottom film 2 positioned in the range in which they are clamped by the upper mold 4a and the lower mold 4b.

Furthermore, at the position where the cross-cutter device 9 is actuated, as shown in the drawing, the endless chain 13 is configured to be guided by the sixth sprocket 14f and the seventh sprocket 14g, be moved below the height of the bottom film 2 and the top film 3, then be guided by the eighth sprocket 14h, and be returned again to the height where the bottom film 2 and the top film 3 can be clamped.

Also in this case, the sixth sprocket 14f is provided with a cam plate (not shown), which is coaxial therewith, and the actuation thereof opens the upper tabs 15 and the lower tabs 16 at the position of the sixth sprocket 14f so that the clamping tabs 12 are separated from the bottom film 2 and the top film 3.

The eighth sprocket 14h is also provided with a cam plate (not shown), which is coaxial therewith, and the actuation thereof closes the upper tabs 15 and the lower tabs 16 at the position of the eighth sprocket 14h so that the clamping tabs 12 can clamp the bottom film 2 and the top film 3.

In other words, the deep-drawing packaging machine 1 according to the present embodiment has a characteristic that the clamping tabs 12 are configured to be brought into a state that the clamping tabs are not in contact also with the top film 3 and the bottom film 2 positioned in the range in contact with the cross-cutter device 9.

In other words, this characteristic can be also expressed as: the deep-drawing packaging machine 1 according to the present embodiment is configured to generate a gap also between each clamping tab 12 and the top film 3 or the bottom film 2 positioned in the range in contact with the cross-cutter device 9.

In the above described embodiment, the endless chain 13 is lowered to be below the height at which the bottom film 2 and the top film 3 can be clamped so that the clamping tabs 12 are brought into the state that the clamping tabs are not in contact with the top film 3 and the bottom film 2. However, as long as the clamping tabs 12 can be brought into the state that the clamping tabs are not in contact with the top film 3 and the bottom film 2, the means thereof is not particularly limited.

Figure 13:
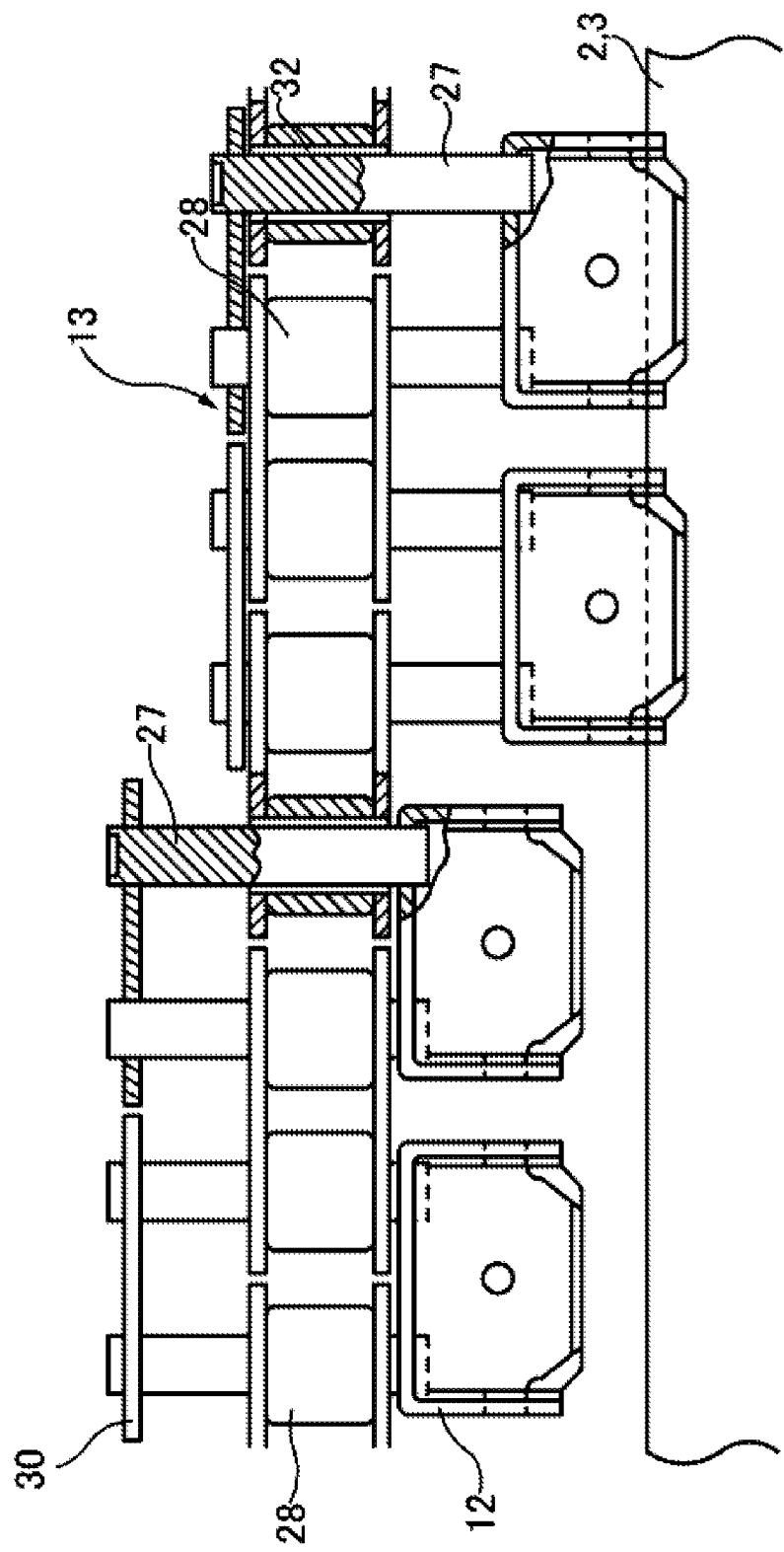
FIG. 13 is a drawing showing the chain 13 according to the embodiment of the present invention.

For example, as shown in FIG. 13, the clamping tabs 12 can be brought into the state that the clamping tabs are not in contact with the top film 3 and the bottom film 2 by increasing the length of shafts 27 of the chain 13 more than a general one. Hereinafter, details of this embodiment will be described.

The chain 13 shown in FIG. 13 has the long shafts 27 so that each of rollers 28 of the chain 13 can largely carry out lateral motion along the shaft 27. Therefore, in the deep-drawing packaging machine 1 provided with the chains 13 according to the present embodiment, opener blocks 29 having a cross-sectional shape as shown in FIG. 14 are disposed below the clamping tabs 12 and the chains 13; and, when each of the opener blocks is moved up and then moved in a lateral direction as shown in (a) to (b) of FIG. 14, an outer plate 30 of the chain 13 can be moved laterally, and the clamping tab 12 can be opened.

By virtue of this configuration, the deep-drawing packaging machine 1 provided with the chains 13 according to the present embodiment is configured so that, at the position in the range in which the top film 3 or the bottom film 2 is clamped by the upper mold 4a and the lower mold 4b when the upper mold 4a and the lower mold 4b of the sealing device 4 are closed and at the position in the range in which the films are in contact with the cross-cutter device 9, the clamping tabs 12 are brought into the state that the clamping tabs are not in contact with the top film 3 and the bottom film 2.

Figure 14:
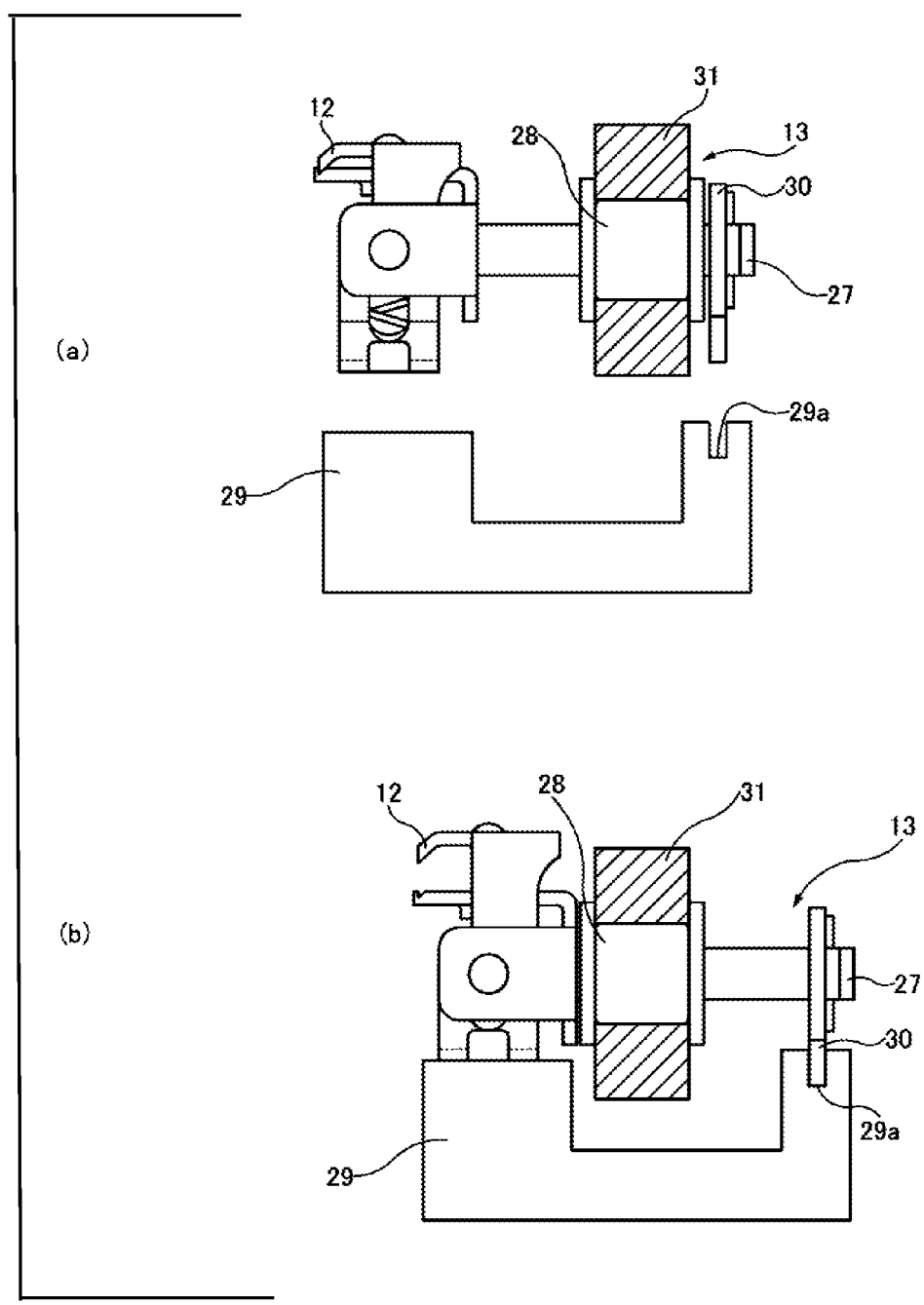
FIG. 14 is a drawing showing the chain 13 according to the embodiment of the present invention.

At the position where the opener block 29 is moved, a chain guide 31 as shown in FIG. 14 is fixedly set so that, even when the opener block 29 is laterally moved, the roller 28 is not laterally moved along with that. In FIG. 14, 29a represents a groove provided on the opener block 29 which is a groove for laterally moving the plate 30 along the outer shaft 27 by the opener block 29.

Furthermore, the present embodiment is configured so that, as shown in FIG. 13, since a sleeve 32 is inserted between the shaft 27 and the roller 28, even if tension is applied to the chain 13, only the sleeve 32 receives the force thereof, and the roller 28 can be laterally moved along the shaft 27 without resistance.

Figure 2:
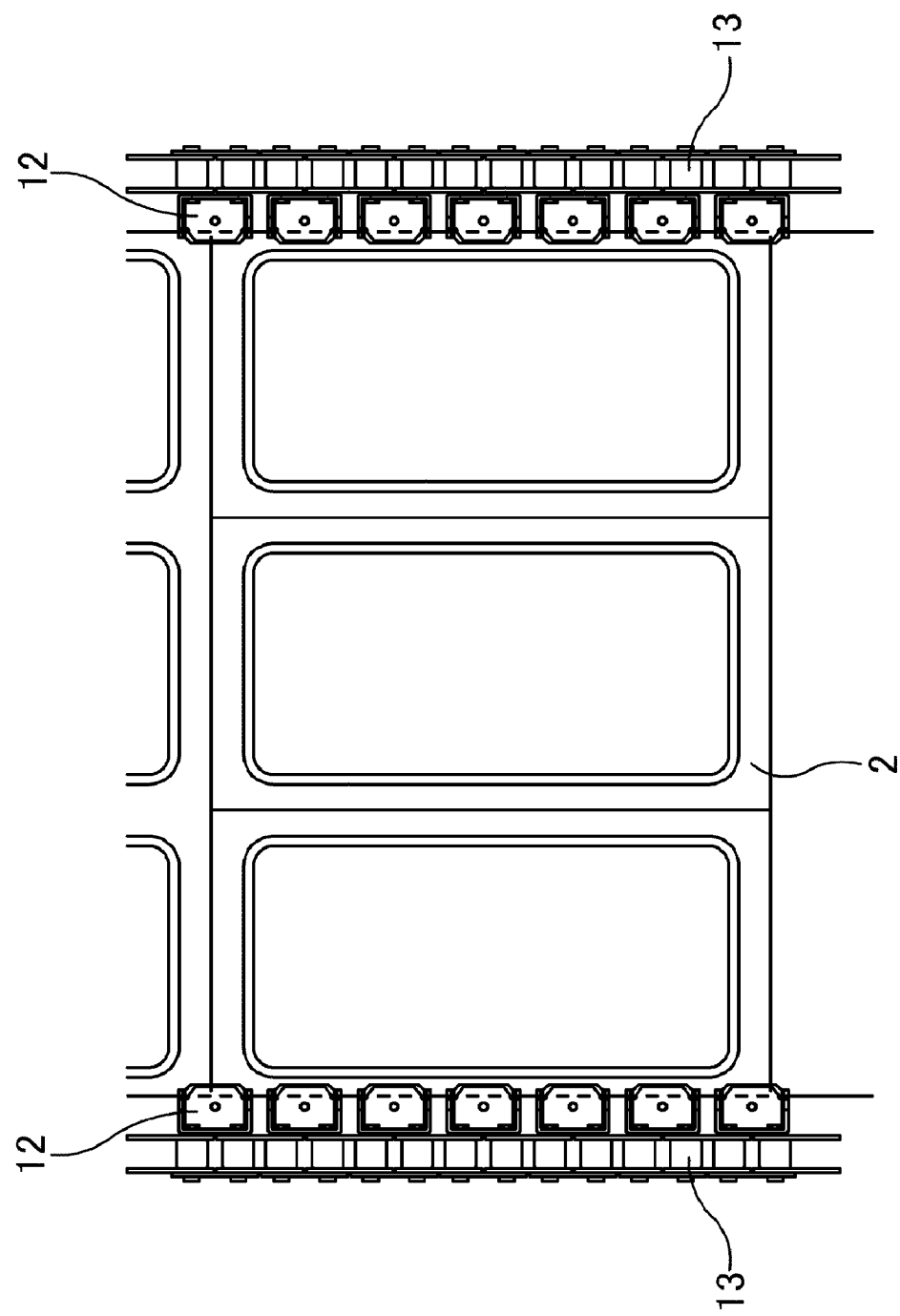
FIG. 2 is a drawing showing a bottom film 2 of the embodiment of the present invention.

Since the deep-drawing packaging machine 1 according to the above described embodiment has the above described configuration, when the bottom film 2 and the top film 3 are to be sealed by the sealing device 4, the both-side edges thereof are not clamped by the clamping tabs 12. Therefore, when the interiors of the containers 5 are to be brought into a vacuum state, air can be removed from the both-side edges of the bottom film 2 and the top film 3; therefore, the bottom film 2 is not required to be provided with punch holes 21. Therefore, when the deep-drawing packaging machine 1 according to the present embodiment is used, the bottom film 2 which does not require the space for providing punch holes as shown in FIG. 2 can be used, and the containers 5 can be manufactured without generating scraps. Thus, reduction in industrial waste management cost and the amount of carbon dioxide discharged can be achieved.

Moreover, when the deep-drawing packaging machine 1 according to the above described embodiment is used, the space for providing the punch holes 21 becomes unnecessary, and, in addition to that, there is no need to consider the interference of the clamping tabs 12 at the actuation positions of the sealing device 4 and the cross-cutter device 9; therefore, both of the bottom film 2 and the top film 3 that have narrower widths than conventional ones can be used, and, as a result, film cost can be reduced. According to a trial calculation of the inventor of the present application, the width of a general film today which is 420 mm can be replaced by a width of 380 mm, the reduction in the width is directly reflected the price of the film, and, therefore, actually, it can be said that the film cost can be reduced by nearly 10%.

Figure 3:
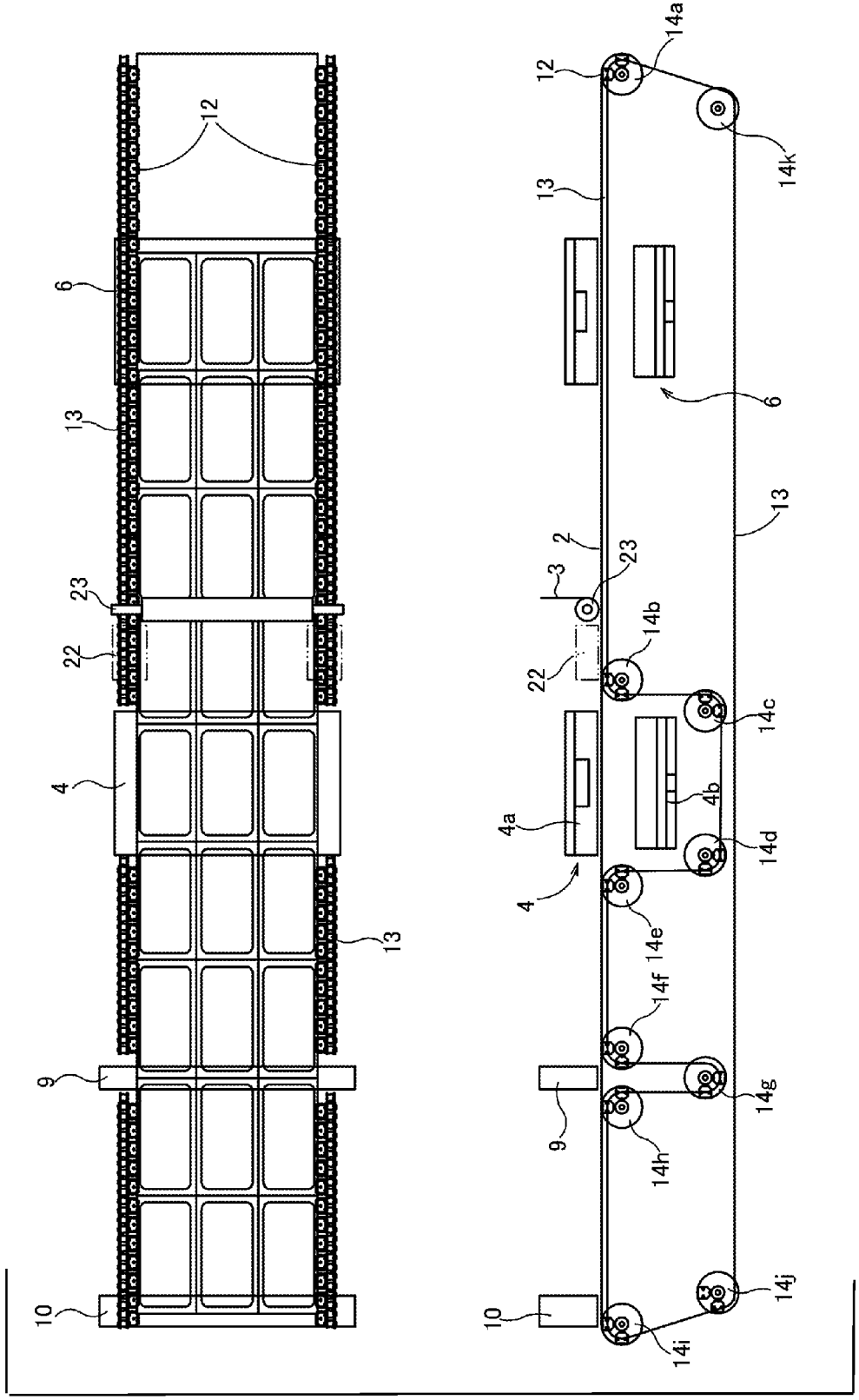
FIG. 3 is a drawing showing the deep-drawing packaging machine 1 according to the embodiment of the present invention.

Next, another embodiment of the present invention will be described. A point that a deep-drawing packaging machine 1 according to the present embodiment is different from the one according to the preceding embodiment is a point that a film temporary-attachment device 22 is further provided as shown in the vicinity of the center of FIG. 3. As shown in the drawing, the film temporary-attachment device 22 is disposed above the endless chains 13 between a return roller 23 of the top film 3 and the sealing device 4 and is configured to temporarily attach the bottom film 2 and the top film 3 before the bottom film 2 and the top film 3 are sealed by the sealing device 4.

Figure 4:
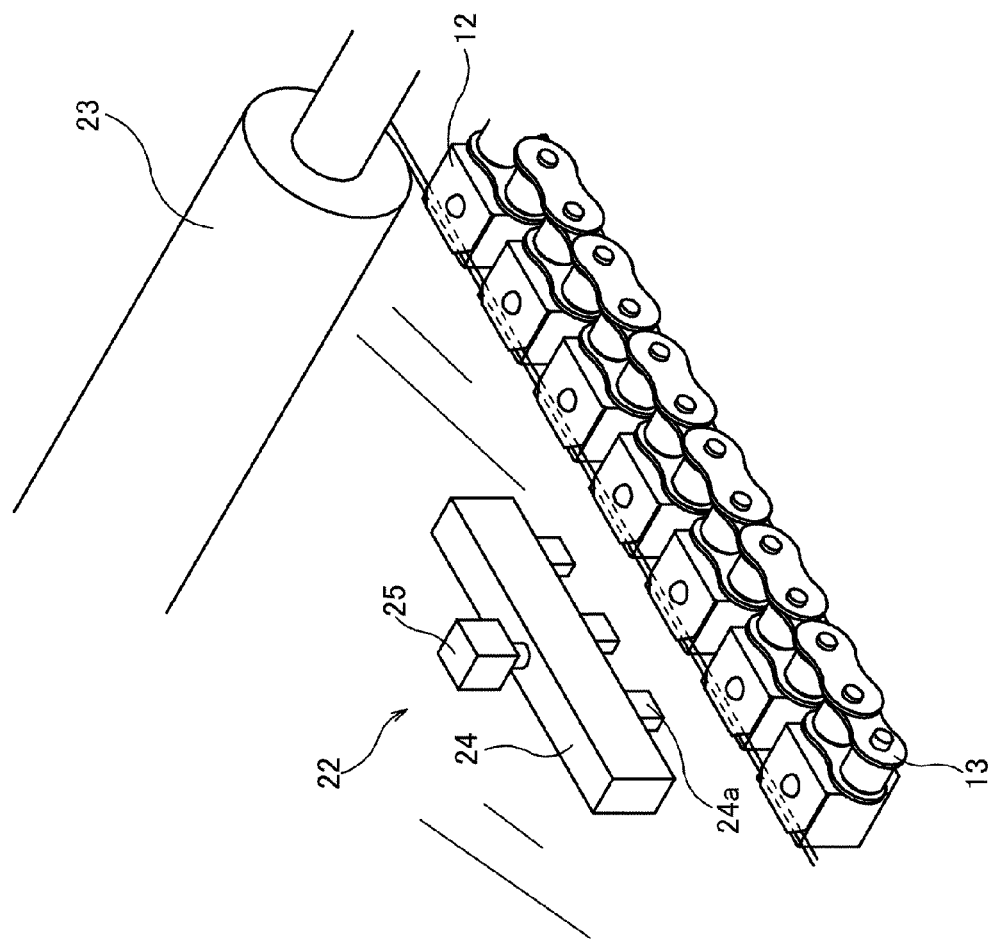
FIG. 4 is a drawing showing a film temporary-attachment device 22.
Figure 5:
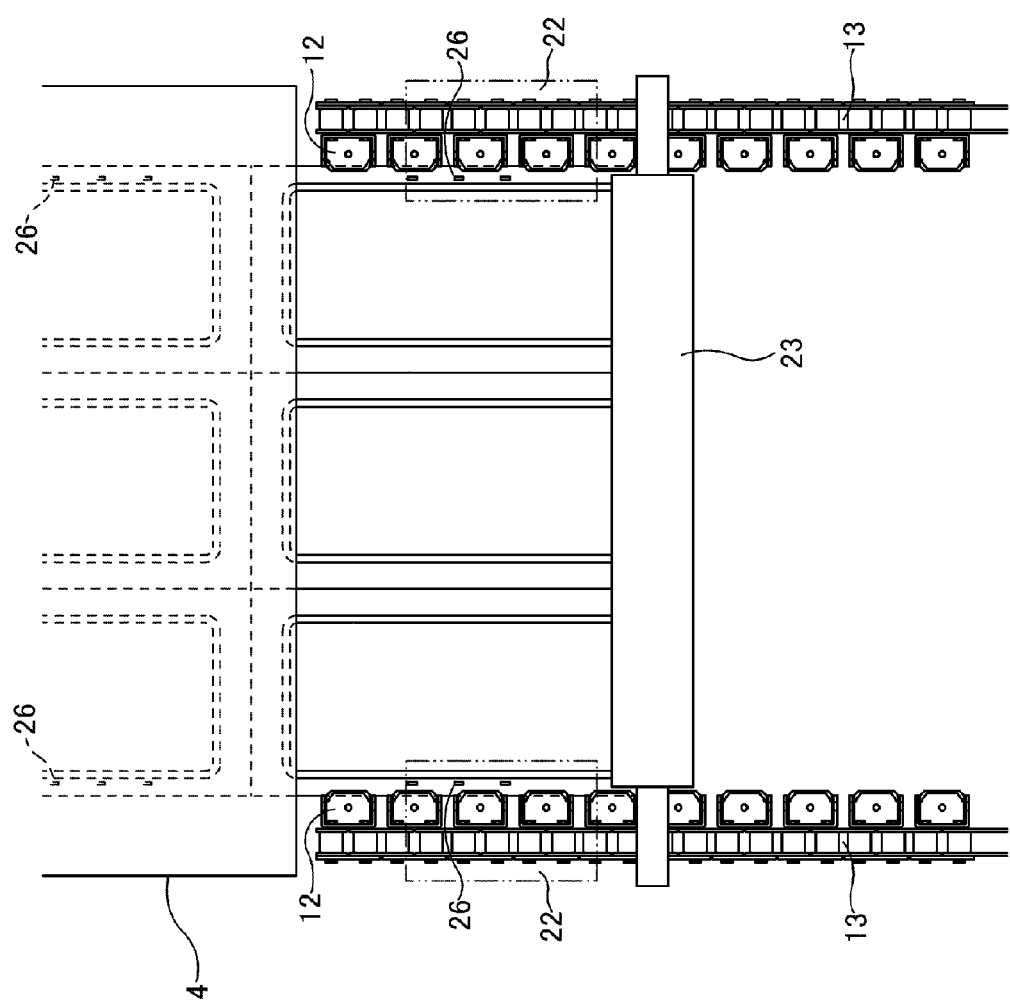
FIG. 5 is a drawing showing the bottom film 2 of the embodiment of the present invention.

FIG. 4 shows a basic structure of the film temporary-attachment device 22. As shown in the drawing, the film temporary-attachment device 22 consists of a cartridge heater 24 and an air cylinder 25, and three projection parts 24a configured to be able to transmit heat to the tips thereof are provided in the lower side of the cartridge heater 24. The cartridge heater 24 is configured to be moved up/down by the air cylinder 25 and is configured to weld and temporarily attach the bottom film 2 and the top film 3 by the heat of the projection parts 24a in the front side of the sealing device 4. FIG. 5 shows the bottom film 2 and the top film 3 in a state that they are temporarily attached by the film temporary-attachment device 22. In this drawing, temporary attachment spots welded by the heat of the projection parts 24a are represented by 26.

When the film temporary-attachment device 22 like this is provided, in the deep-drawing packaging machine 1 according to the present embodiment, the bottom film 2 and the top film 3 are temporarily attached; therefore, even if the films are not clamped by the clamping tabs 12 when they pass through the sealing device 4, drooping of the bottom film 2 from the top film 3 can be prevented, and width-direction misalignment of the bottom film 2 and the top film 3 can be also effectively prevented. Since the temporary attachment spots 26 have extremely small areas and have sufficient intervals between adjacent ones, the spots do not particularly cause problems even when air is removed from the containers 5 at the sealing device 4 after the temporary attachment.

INDUSTRIAL APPLICABILITY

As described above, according to the present invention, a deep-drawing packaging machine that is related to a deep-drawing packaging machine used for packaging, for example, food and is particularly capable of manufacturing packaging containers without generating scraps from films and thereby capable of achieving reduction in film cost, industrial waste management cost, and the amount of carbon dioxide discharged is provided.

REFERENCE SIGNS LIST

1: DEEP-DRAWING PACKAGING MACHINE
2: BOTTOM FILM
3: TOP FILM
4: SEALING DEVICE
5: CONTAINER
6: MOLDING DEVICE
7: UNPROCESSED ROLL OF BOTTOM FILM 2
8: UNPROCESSED ROLL OF TOP FILM 3
9: CROSS-CUTTER DEVICE
10: LENGTH-CUTTER DEVICE
11: INFEED ROLLER
12: CLAMPING TAB
13: ENDLESS CHAIN
14: SPROCKET
15: UPPER TAB
16: LOWER TAB
17: SPRING
18: SEALING HOT PLATE
19a, 19b: VENTILATION HOLE
20: VENTILATION PIPE
21: PUNCH HOLE
22: FILM TEMPORARY-ATTACHMENT DEVICE
23: RETURN ROLLER
24: CARTRIDGE HEATER
25: AIR CYLINDER
26: TEMPORARY ATTACHMENT SPOT
27: SHAFT
28: ROLLER
29: OPENER BLOCK
29a: GROOVE PROVIDED ON OPENER BLOCK 29
30: OUTER PLATE
31: CHAIN GUIDE
32: SLEEVE

The invention claimed is:

1. A deep-drawing packaging machine comprising:
a sealing device that clamps and seals a top film and a bottom film by an upper mold and a lower mold;
clamping tabs that clamp two side edges of at least one of the top film and the bottom film;
a carrying device that carries the at least one of the top film and the bottom film clamped by the clamping tabs; and
a cutter that cuts the sealed top film and bottom film at a predetermined position;
wherein:
a gap is generated between (i) the top film and the bottom film and (ii) each one of the clamping tabs that is positioned along a range of the top film and the bottom film that is being clamped by the upper mold and the lower mold, when the upper mold and the lower mold of the sealing device are closed; and
a gap is also generated between (i) the top film and the bottom film and (ii) each one of the clamping tabs that is positioned along a range of the top film and the bottom film that is in contact with the cutter.

* * * * *